US012776449B2

(12) United States Patent
Araki

(10) Patent No.: US 12,776,449 B2
(45) Date of Patent: Oct. 27, 2026

(54) MULTILAYER CERAMIC CAPACITOR

(71) Applicant: Murata Manufacturing Co., Ltd., Nagaokakyo (JP)

(72) Inventor: Keisuke Araki, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 154 days.

(21) Appl. No.: 18/976,399

(22) Filed: Dec. 11, 2024

(65) Prior Publication Data

US 2025/0104917 A1 Mar. 27, 2025

Related U.S. Application Data

(63) Continuation of application No. PCT/JP2023/025254, filed on Jul. 7, 2023.

(30) Foreign Application Priority Data

Jul. 29, 2022 (JP) ................................ 2022-121485

(51) Int. Cl.
*H01G 4/12* (2006.01)
*H01G 4/30* (2006.01)

(52) U.S. Cl.
CPC ............ *H01G 4/1227* (2013.01); *H01G 4/30* (2013.01)

(58) Field of Classification Search
CPC ................................ H01G 4/1227; H01G 4/30
See application file for complete search history.

(56) References Cited

U.S. PATENT DOCUMENTS

| | | | | |
|---|---|---|---|---|
| 9,281,125 | B2 * | 3/2016 | Taniguchi | H01G 4/1227 |
| 2003/0039090 | A1 | 2/2003 | Konaka et al. | |
| 2004/0063566 | A1 * | 4/2004 | Caspers | C04B 35/4682 501/137 |
| 2004/0105214 | A1 * | 6/2004 | Nakamura | H01G 4/1227 361/321.2 |
| 2005/0286207 | A1 | 12/2005 | Ito et al. | |

(Continued)

FOREIGN PATENT DOCUMENTS

| | | | |
|---|---|---|---|
| JP | 2002274936 | A | 9/2002 |
| JP | 2008010530 | A | 1/2008 |

(Continued)

OTHER PUBLICATIONS

International Search Report in PCT/JP2023/025254, mailed Oct. 3, 2023, 4 pages.

(Continued)

*Primary Examiner* — Michael P Mcfadden
(74) *Attorney, Agent, or Firm* — Keating & Bennett, LLP

(57) ABSTRACT

A multilayer ceramic capacitor includes dielectric layers including at least Ti, a region in a center portion in a width direction and a lamination direction of the dielectric layers with a dimension in the width direction of about 800 nm and a dimension in the lamination direction of about 1 nm is divided into 800 cells with a size of a dimension in the width direction of about 1 nm and a dimension in the lamination direction of about 1 nm. When a cell in which a mole ratio of rare earths is about 5 mol % or more with respect to 100 mol of Ti is a high concentration cell, about 75% or more and less than about 100% of the 800 cells in the region are high concentration cells.

19 Claims, 9 Drawing Sheets

(56) References Cited

U.S. PATENT DOCUMENTS

| | | | | |
|---|---|---|---|---|
| 2008/0089008 | A1* | 4/2008 | Nishikawa | C04B 35/4682 501/138 |
| 2009/0244805 | A1* | 10/2009 | Banno | H01G 4/1227 252/62.3 BT |
| 2017/0283328 | A1* | 10/2017 | Sakurai | C04B 35/64 |
| 2019/0228911 | A1* | 7/2019 | Inomata | H01G 4/008 |
| 2023/0020287 | A1 | 1/2023 | Yamaguchi | |

FOREIGN PATENT DOCUMENTS

| | | | |
|---|---|---|---|
| JP | 2018139261 | A | 9/2018 |
| KR | 20060046513 | A | 5/2006 |
| WO | 2021131819 | A1 | 7/2021 |

OTHER PUBLICATIONS

Written Opinion in PCT/JP2023/025254, mailed Oct. 3, 2023, 3 pages.

* cited by examiner

FIG. 9

| | RATIO OF HIGH CONCENTRATION REGION IN ONE LINE | RELATIVE PERMITTIVITY | TEMPERATURE CHARACTERISTICS OF RELATIVE PERMITTIVITY (BASED ON 20°C) | MTTF | HIGH CONCENTRATION REGION RATE | LOW CONCENTRATION REGION RATE |
|---|---|---|---|---|---|---|
| EXAMPLE 1 | 95% | 3643 | −38% | 90.1 | 43% | 34% |
| EXAMPLE 2 | 92% | 3320 | −39% | 47.4 | 39% | 32% |
| EXAMPLE 3 | 90% | 3204 | −39% | 30.5 | 35% | 32% |
| EXAMPLE 4 | 86% | 3170 | −38% | 28.2 | 24% | 35% |
| EXAMPLE 5 | 82% | 3139 | −38% | 27.7 | 16% | 53% |
| EXAMPLE 6 | 76% | 2670 | −35% | 9.0 | 9% | 71% |
| COMPARATIVE EXAMPLE 1 | 100% | 3154 | −54% | 431.5 | 100% | 0% |
| COMPARATIVE EXAMPLE 2 | 1% | 2749 | −12% | 1.6 | 0% | 95% |
| COMPARATIVE EXAMPLE 3 | 60% | 2749 | −12% | 2.3 | 6% | 75% |

MULTILAYER CERAMIC CAPACITOR

CROSS REFERENCE TO RELATED APPLICATIONS

This application claims the benefit of priority to Japanese Patent Application No. 2022-121485 filed on Jul. 29, 2022 and is a Continuation application of PCT Application No. PCT/JP2023/025254 filed on Jul. 7, 2023. The entire contents of each application are hereby incorporated herein by reference.

BACKGROUND OF THE INVENTION

1. Field of the Invention

The present invention relates to multilayer ceramic capacitors.

2. Description of the Related Art

There has been known a multilayer ceramic capacitor that includes a multilayer body in which multiple dielectric layers and multiple inner electrode layers are alternately laminated with each other and an outer electrode provided on a surface of the multilayer body and electrically connected with the inner electrode layers extending to the surface of the multilayer body.

In recent years, while the uses of the multilayer ceramic capacitor have been expanding, the usage environment has been increasingly harsh, and there have been more uses in a high temperature environment. When a high electric field is applied in the high temperature environment, there is a problem of reduction in the insulation resistance.

Japanese Unexamined Patent Application Publication No. 2008-10530 describes a multilayer ceramic capacitor that includes a dielectric layer including multiple crystal particles in which barium titanate is a main component and in which magnesium, manganese, and a rare earth element are dissolved as oxides. With the crystal particles included in the dielectric layer and having a core-shell structure formed of a core portion and a shell portion around the core portion like the ceramic capacitor described in Japanese Unexamined Patent Application Publication No. 2008-10530, it is possible to suppress deterioration of the insulation resistance under the high temperature environment.

However, even with a configuration in which a dielectric layer includes crystal particles having the core-shell structure such as the multilayer ceramic capacitor described in Japanese Unexamined Patent Application Publication No. 2008-10530, it is impossible to sufficiently suppress the deterioration of the insulation resistance in the high temperature environment, and there is room for improvement. Additionally, there is also a case where the improvement of the reliability and the improvement of the temperature characteristics contradict each other.

SUMMARY OF THE INVENTION

Example embodiments of the present invention provide multilayer ceramic capacitors each with a good balance between an improvement of reliability and an improvement of temperature characteristics.

A multilayer ceramic capacitor according to an example embodiment of the present invention includes a multilayer body including dielectric layers and inner electrode layers alternately laminated with each other, and an outer electrode on a surface of the multilayer body and electrically connected with the inner electrode layers extending to the surface of the multilayer body. The dielectric layers include at least Ti. A region in a center portion in a lamination direction of the dielectric layers and a width direction orthogonal or substantially orthogonal to the lamination direction, which has a length in the width direction of about 800 nm and a length in the lamination direction of about 1 nm, is divided into 800 cells having a size of a length in the width direction of about 1 nm and a length in the lamination direction of about 1 nm. When a cell in which a mole ratio of rare earths is about 5 mol % or more with respect to 100 mol of Ti is a high concentration cell, about 75% or more and less than about 100% of the 800 cells in the region are high concentration cells.

Additionally, a multilayer ceramic capacitor according to an example embodiment of the present invention includes a multilayer body including dielectric layers and inner electrode layers alternately laminated with each other, and an outer electrode on a surface of the multilayer body and electrically connected with the inner electrode layers extending to the surface of the multilayer body. The dielectric layers includes at least Ti. A region in a center portion in a lamination direction of the dielectric layers and a width direction orthogonal or substantially orthogonal to the lamination direction, which has a length in the width direction of about 800 nm and a length in the lamination direction of about 800 nm, is divided into 800 cells in the width direction and 800 cells in the lamination direction each having a size of a length in the width direction of about 1 nm and a length in the lamination direction of about 1 nm. An array of cells in the width direction is a row, and an array of cells in the lamination direction is a column. When a cell in which a mole ratio of rare earths is about 5 mol % or more with respect to 100 mol of Ti is a high concentration cell, and when a row in which about 75% or more of 800 cells in a same row are high concentration cells is a high concentration row, about 98 or more and about 43% or less of 800 rows in the region are high concentration rows.

According to example embodiments of the present invention, it is possible to provide multilayer ceramic capacitors each with a good balance between an improvement of reliability and an improvement of temperature characteristics.

The above and other elements, features, steps, characteristics and advantages of the present invention will become more apparent from the following detailed description of the example embodiments with reference to the attached drawings.

BRIEF DESCRIPTION OF THE DRAWINGS

FIG. 9 is a diagram illustrating characteristics of a multilayer ceramic capacitor according to an example embodiment of the present invention.

DETAILED DESCRIPTION OF THE EXAMPLE EMBODIMENTS

Example embodiments of the present invention will be described below with reference to the drawings.

An example of an example embodiment of the present invention is described below with reference to the drawings. Note that, the same or corresponding portions between the drawings are provided with the same reference signs.

Outer Shape of Multilayer Ceramic Capacitor

Figure 1:
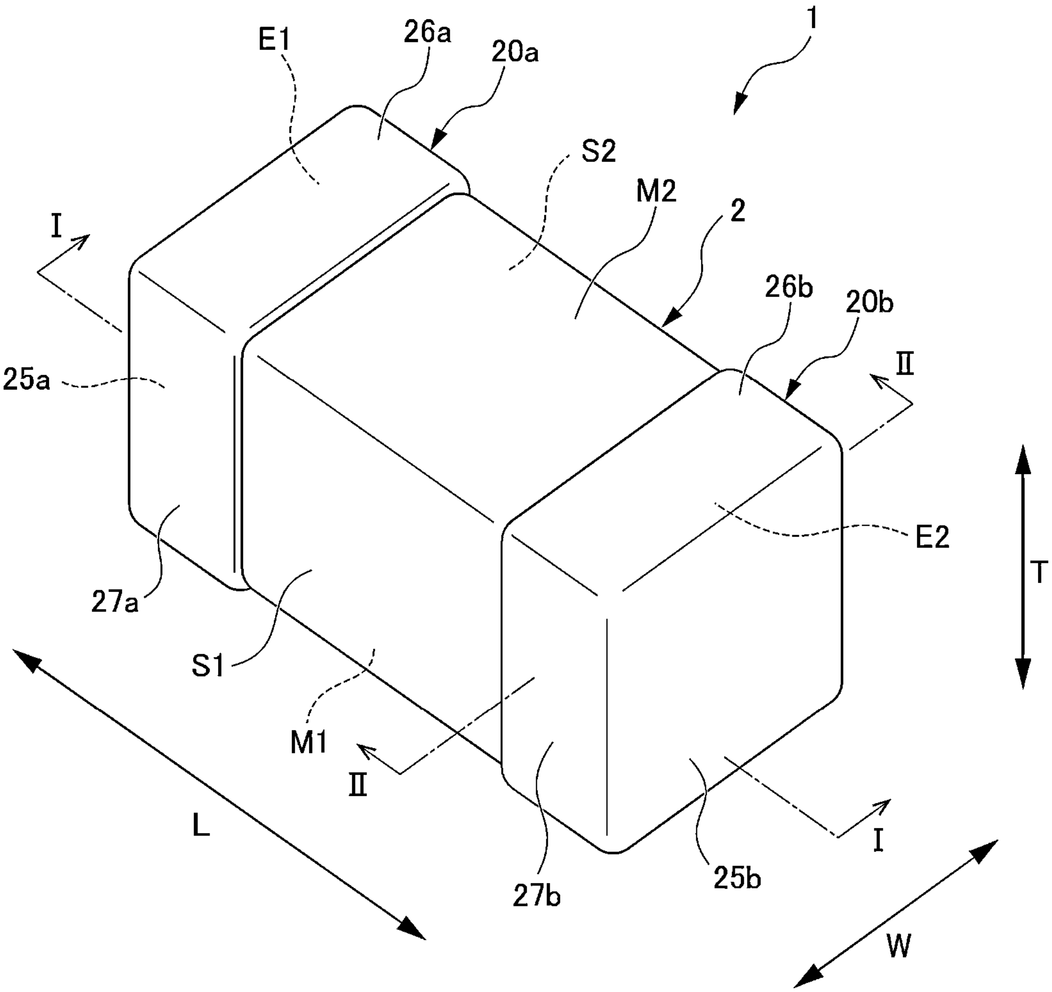
FIG. 1 is a perspective view of a multilayer ceramic capacitor according to an example embodiment of the present invention.

An overview of the exterior of a multilayer ceramic capacitor 1 according to an example embodiment of the present invention is described based on FIG. 1. FIG. 1 is a perspective view illustrating the multilayer ceramic capacitor 1 of the present example embodiment.

The multilayer ceramic capacitor 1 includes a multilayer body 2 and outer electrodes 20. The outer electrodes 20 include a first outer electrode 20*a* and a second outer electrode 20*b*.

Definitions of Directions

An L direction, a W direction, and a T direction are illustrated in FIGS. 1 to 8. The L direction is a length direction L of the multilayer ceramic capacitor 1. The W direction is a width direction W of the multilayer ceramic capacitor 1. The T direction is a lamination direction T of the multilayer ceramic capacitor 1.

Figure 2:
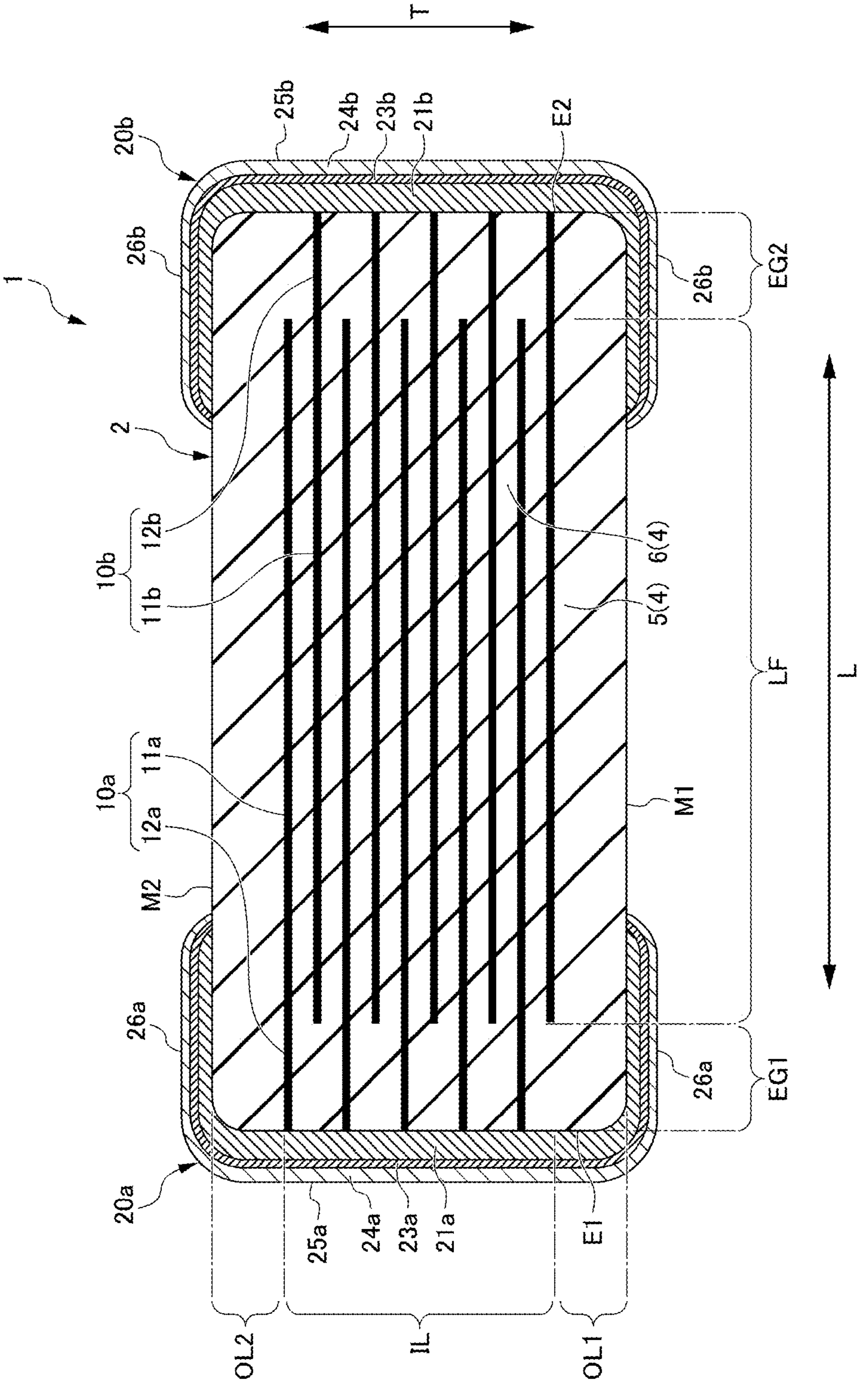
FIG. 2 is a sectional view taken along I-I line in FIG. 1.
Figure 3:
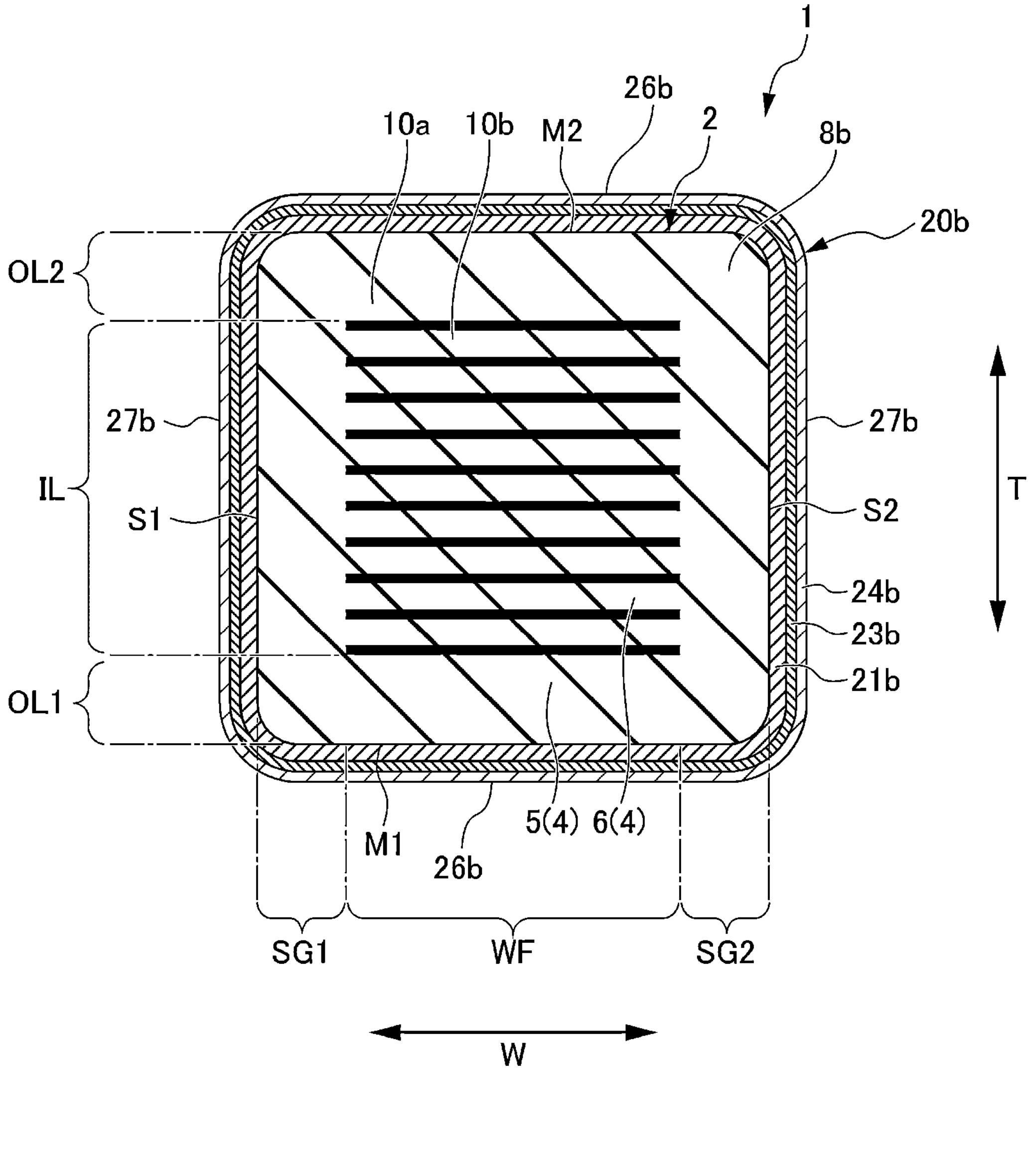
FIG. 3 is a sectional view taken along II-II line in FIG. 1.

Thus, a section illustrated in FIG. 2 is referred to as an LT section, and a section illustrated in FIG. 3 is referred to as a WT section.

The length direction L, the width direction W, and the lamination direction T do not necessarily have a relationship of being orthogonal or substantially orthogonal to each other. The length direction L, the width direction W, and the lamination direction T may have a relationship of crossing each other.

Outer Shape of Multilayer Body

As illustrated in FIG. 1, the multilayer body 2 has a rectangular or substantially rectangular parallelepiped shape.

The multilayer body includes two main surfaces M, two end surfaces E, and two side surfaces S. The main surfaces M face each other in the lamination direction T. The end surfaces E face each other in the length direction L. The side surfaces S face each other in the width direction W.

The two main surfaces M include a first main surface M1 and a second main surface M2. The two end surfaces E include a first end surface E1 and a second end surface E2. The two side surfaces S include a first side surface S1 and a second side surface S2.

It is preferable that a ridge portion and a corner portion of the multilayer body 2 are rounded. The ridge portion is a portion at which two surfaces of the multilayer body 2 meet each other. The corner portion is a portion at which three surfaces of the multilayer body 2 meet each other.

Size of Multilayer Body

A size of the multilayer body 2 is not particularly limited. For example, a dimension of the multilayer body 2 in the length direction L may be about 0.05 mm or more and about 1.00 mm or less. A dimension of the multilayer body 2 in the lamination direction T may be about 0.10 mm or more and about 0.50 mm or less. A dimension of the multilayer body 2 in the width direction W may be about 0.10 mm or more and about 0.50 mm or less.

It is possible to measure the length of each portion of the multilayer body 2 by a micrometer or an optical microscope, for example. The dimension in the length direction L is not necessarily longer than the dimension in the width direction W.

Internal Structure of Multilayer Body

An internal structure of the multilayer body 2 is described based on FIG. 2. FIG. 2 is a sectional view of the multilayer ceramic capacitor that is taken along I-I line illustrated in FIG. 1.

The multilayer body 2 includes multiple dielectric layers 4 and multiple inner electrode layers 10. The multiple dielectric layers 4 and the multiple inner electrode layers 10 are laminated with each other in the lamination direction T.

Inner Layer Portion and Outer Layer Portions

The multilayer body 2 includes an inner layer portion IL and outer layer portions OL in the lamination direction T. The outer layer portions OL include a first outer layer portion OL1 and a second outer layer portion OL2. The first outer layer portion OL1 and the second outer layer portion OL2 are arranged with the inner layer portion IL interposed therebetween in the lamination direction T.

The inner layer portion IL includes a portion of the multiple dielectric layers 4 and the multiple inner electrode layers 10. In the inner layer portion IL, the multiple inner electrode layers 10 are arranged to face each other with the dielectric layer 4 interposed therebetween.

The inner layer portion IL is a portion in which an electrostatic capacitance is generated and is a portion that substantially defines and functions as a capacitor. Accordingly, the inner layer portion IL is also called an effective portion.

The first outer layer portion OL1 is arranged on a first main surface M1 side of the multilayer body 2. The second outer layer portion OL2 is arranged on a second main surface M2 side of the multilayer body 2.

Specifically, the first outer layer portion OL1 is arranged between one of the multiple inner electrode layers 10 that is closest to the first main surface M1 and the first main surface M1. The second outer layer portion OL2 is arranged between one of the multiple inner electrode layers 10 that is closest to the second main surface M2 and the second main surface M2.

The first outer layer portion OL1 and the second outer layer portion OL2 do not include the inner electrode layers 10. The first outer layer portion OL1 and the second outer layer portion OL2 include the remaining dielectric layers 4 except the dielectric layers 4 in the inner layer portion IL.

The first outer layer portion OL1 and the second outer layer portion OL2 define and function as protection layers of the inner layer portion IL.

Dielectric Layers

The dielectric layers 4 include outer dielectric layers 5 and inner dielectric layers 6.

Outer Dielectric Layers

The outer dielectric layers 5 include some of the dielectric layers 4 that define the first outer layer portion OL1 and the second outer layer portion OL2. The outer dielectric layers 5 are arranged between the first main surface M1 and one of the inner electrode layers 10 that is closest to the first main surface M1 and between the second main surface M2 and one of the inner electrode layers 10 that is closest to the second main surface M2.

Inner Dielectric Layers

The inner dielectric layers 6 include the dielectric layers 4 that are each positioned between the inner electrode layers 10 and define the inner layer portion IL with the inner electrode layers 10.

The inner dielectric layer 6 is arranged between a first inner electrode layer 10*a* and a second inner electrode layer 10*b* that are described below.

Number of Dielectric Layers

The dielectric layers 4 laminated in the multilayer body 2 may be, for example, 10 layers or more and 2000 layers or less.

Thickness of Dielectric Layers

In the dielectric layers 4, a thickness of the outer dielectric layer 5 may be, for example, about 10 μm or more and about 100 μm or less. A thickness of the inner dielectric layer 6 may be, for example, about 0.8 μm or more and about 3.0 μm or less.

Material of Dielectric Layers

A material of the dielectric layer 4 may be, for example, dielectric ceramic including $BaTiO_3$, $CaTiO_3$, $SrTiO_3$, $CaZrO_3$, $TiO_2$, or the like.

The material of the dielectric layer 4 may be the above-described dielectric ceramic to which, for example, a Mn compound, an Fe compound, a Cr compound, a Co compound, a Ni compound, or the like is added by a content smaller than that of a main component.

Inner Electrode Layers

The inner electrode layers 10 include first inner electrode layers 10*a* and second inner electrode layers 10*b*. The first inner electrode layers 10*a* are the inner electrode layers 10 connected to the first outer electrode 20*a*. The second inner electrode layers 10*b* are the inner electrode layers 10 connected to the second outer electrode 20*b*.

The first inner electrode layers 10*a* extend from the first end surface E1 toward the second end surface E2. The second inner electrode layers 10*b* extend from the second end surface E2 toward the first end surface E1.

Facing Portions and Extended Portions

The first inner electrode layers 10*a* and the second inner electrode layers 10*b* each include a facing electrode portion 11 and an extended electrode portion 12.

The facing electrode portion 11 is a portion in the inner electrode layer 10 in which the first inner electrode layer 10*a* and the second inner electrode layer 10*b* face each other in the lamination direction T. The extended electrode portion 12 is a portion in the inner electrode layer 10 that extends from the facing electrode portion 11 to an end surface E1 or an end surface E2 of the multilayer body 2.

The facing electrode portion 11 of the first inner electrode layer 10*a* is a first facing electrode portion 11*a*, and the extended electrode portion 12 of the first inner electrode layer 10*a* is a first extended electrode portion 12*a*. The first extended electrode portion 12*a* is a portion extending from the first facing electrode portion 11*a* to the first end surface E1 of the multilayer body 2.

Similarly, the facing electrode portion 11 of the second inner electrode layer 10*b* is a second facing electrode portion 11*b*, and the extended electrode portion 12 of the second inner electrode layer 10*b* is a second extended electrode portion 12*b*. The second extended electrode portion 12*b* is a portion extending from the second facing electrode portion 11*b* to the second end surface E2 of the multilayer body 2.

Number of Inner Electrode Layers

The inner electrode layers 10 may be, for example, 10 layers or more and 1000 layers or less. This number of the inner electrode layers 10 includes the number of the first inner electrode layers 10*a* and the second inner electrode layers 10*b*.

Thickness of Inner Electrode Layers

A thickness of the inner electrode layer 10 may be, for example, about 0.3 μm or more and about 0.4 μm or less.

Material of Inner Electrode Layers

A material of the inner electrode layers 10 may be, for example, a metal such as Ni, Cu, Ag, Pd, or Au, an alloy of Ni and Cu, an alloy of Ag and Pd, or the like. In addition, the material of the inner electrode layer 10 may also include, for example, dielectric particles with the same composition as that of the ceramic included in the dielectric layer 4.

Sn may be arranged on an interface between the inner electrode layer 10 and the dielectric layer 4. This Sn may be in the form of a layer or may be scattered.

Sn may be dissolved on an inner electrode layer 10 side or may be dissolved in a dielectric grain on a dielectric layer 4 side.

Electrode Facing Portions

Divisions of the multilayer body 2 in the length direction L are described.

The multilayer body 2 includes an electrode facing portion LF and end gap portions EG in the length direction L. The end gap portions EG include a first end gap portion EG1 and a second end gap portion EG2.

The electrode facing portion LF is a portion in which the first inner electrode layer 10*a* and the second inner electrode layer 10*b* face each other in the lamination direction T. That is, the electrode facing portion LF is a portion in which the first facing electrode portion 11*a* and the second facing electrode portion 11*b* face each other in the lamination direction T.

The electrode facing portion LF is positioned in a center portion of the multilayer body 2 in the length direction L.

The electrode facing portion LF is a portion in which an electrostatic capacitance is generated and a portion that substantially defines and functions as a capacitor. Accordingly, the electrode facing portion LF is also called an effective portion.

End Gap Portions

The end gap portions EG are portions in which the first inner electrode layer 10*a* and the second inner electrode layer 10*b* do not face each other in the lamination direction T.

Specifically, the first end gap portion EG1 is a portion in which the first inner electrode layer 10*a* is provided but the second inner electrode layer 10*b* is not provided in the lamination direction T. Similarly, the second end gap portion EG2 is a portion in which the second inner electrode layer 10*b* is provided but the first inner electrode layer 10*a* is not provided.

The first end gap portion EG1 corresponds to a portion in which the first extended electrode portion 12*a* is provided, and the second end gap portion EG2 corresponds to a portion in which the second extended electrode portion 12*b* is provided.

The first end gap portion EG1 defines and functions as an extended electrode of the first inner electrode layer 10*a* to the first end surface E1, and the second end gap portion EG2 defines and functions as an extended electrode of the second inner electrode layer 10*b* to the second end surface E2.

Since each of the end gap portions EG is a division in the length direction L, it is also called an L gap.

A length of the end gap portion EG in the length direction L may be, for example, about 5 μm or more and about 30 μm or less.

Outer Electrodes

The outer electrodes include the first outer electrode 20*a* and the second outer electrode 20*b*.

First Outer Electrode

The first outer electrode 20*a* is an outer electrode provided on the first end surface E1 of the multilayer body 2. The first outer electrode 20*a* is electrically connected with the first inner electrode layer 10*a*.

Second Outer Electrode

The second outer electrode 20*b* is an outer electrode provided on the second end surface E2 of the multilayer body 2. The second outer electrode 20*b* is electrically connected with the second inner electrode layer 10*b*.

Outer Electrodes on Each Surface

The outer electrodes 20 extend from the end surfaces E to a portion of the two main surfaces M and a portion of the two side surfaces S.

In the outer electrodes 20, portions provided on the end surfaces E are end surface outer electrodes 25. In the outer electrodes 20, portions provided on the portion of the main surfaces M are main surface outer electrodes 26. In the outer electrodes 20, portions provided on the portion of the side surfaces S are side surface outer electrodes 27.

Specifically, in the first outer electrode 20*a*, a portion provided on the first end surface E1 is a first end surface outer electrode 25*a*. In the first outer electrode 20*a*, a portion provided on a portion of the first main surface M1 or a portion of the second main surface M2 is a first main surface outer electrode 26*a*. In the first outer electrode 20*a*, a portion provided on a portion of the first side surface S1 or a portion of the second side surface S2 is a first side surface outer electrode 27*a*.

Additionally, as with the first outer electrode 20*a*, as for the second outer electrode 20*b*, in the second outer electrode 20*b*, a portion provided on the second end surface E2 is a second end surface outer electrode 25*b*. In the second outer electrode 20*b*, a portion provided on a portion of the first main surface M1 or a portion of the second main surface M2 is a second main surface outer electrode 26*b*. In the second outer electrode 20*b*, a portion provided on a portion of the first side surface S1 or a portion of the second side surface S2 is a second side surface outer electrode 27*b*.

Layer Configuration of Outer Electrodes

A layer configuration of the outer electrodes 20 is described based on FIG. 2.

The outer electrodes 20 each include three layers including a foundation electrode layer 21, an inner plating layer 23, and a surface plating layer 24. These layers are arranged in the order of the foundation electrode layer 21, the inner plating layer 23, and the surface plating layer 24 from corresponding one of the end surfaces E of the multilayer body 2.

Specifically, the first outer electrode 20*a* includes a first foundation electrode layer 21*a*, a first inner plating layer 23*a*, and a first surface plating layer 24*a*. Similarly, the second outer electrode 20*b* includes a second foundation electrode layer 21*b*, a second inner plating layer 23*b*, and a second surface plating layer 24*b*.

In the descriptions of the outer electrodes 20, in some cases, a direction extending away from one of the end surfaces E of the multilayer body 2 is assumed to be upward.

Foundation Electrode Layer

The first foundation electrode layer 21*a* is provided on the first end surface E1 of the multilayer body 2 and covers the first end surface E1. The first foundation electrode layer 21*a* may extend from the first end surface E1 to a portion of the first main surface M1, a portion of the second main surface M2, a portion of the first side surface S1, and a portion of the second side surface S2.

Similarly, the second foundation electrode layer 21*b* is provided on the second end surface E2 of the multilayer body 2 and covers the second end surface E2. The second foundation electrode layer 21*b* may extend from the second end surface E2 to a portion of the second main surface M1, a portion of the second main surface M2, a portion of the first side surface S1, and a portion of the second side surface S2.

Fired Layer

The foundation electrode layer 21 may be a fired layer including metal and glass.

The fired layer is a layer obtained by applying a conductive paste including metal and glass to the multilayer body by, for example, a dipping method and firing. The fired layer may include multiple layers.

The metal included in the fired layer includes, for example, Cu as a main component. Additionally, as the metal, for example, at least one of Ni, Ag, Pd, or Au and an alloy such as a Ag—Pd alloy may be included as the main component or may be contained as a component other than the main component.

The glass included in the fired layer may include a glass component including, for example, at least one of B, Si, Ba, Mg, Al, Li, and the like. For example, borosilicate glass may be used.

The foundation electrode layer 21 may be a conductive resin layer including conductive particles and thermosetting resin. The conductive resin layer may be provided on the fired layer or may be directly provided on the multilayer body without providing the fired layer.

The conductive resin layer is a layer obtained by applying a conductive paste including the conductive particles and the thermosetting resin to the multilayer body by an application method and firing. The conductive resin layer may include multiple layers.

A thickness per layer of the foundation electrode layer 21 as the fired layer or the conductive resin layer is not particularly limited and may be, for example, about 1 μm or more and about 10 μm or less.

The foundation electrode layer 21 may be, for example, a thin film layer with a thickness of about 1 μm or less in which metal particles are deposited and that is formed by a thin film formation method such as a sputtering method or a vapor deposition method.

Inner Plating Layer

The inner plating layer 23 is provided on the foundation electrode layer 21 and covers at least a portion of the foundation electrode layer 21. The inner plating layer 23 includes, for example, at least one of Cu, Ni, Ag, Pd, or Au and an alloy such as a Ag—Pd alloy.

Surface Plating Layer

The surface plating layer 24 is provided on the inner plating layer 23 and covers at least a portion of the inner plating layer 23. The surface plating layer 24 includes, for example, a metal such as Sn.

For example, the inner plating layer 23 is preferably a Ni plating layer, and the surface plating layer 24 is preferably an Sn plating layer.

The Ni plating layer can prevent the foundation electrode layer from being eroded by soldering during the implementation of a ceramic electronic component. The Sn plating layer can improve the wettability during the implementation of the ceramic electronic component and can facilitate the implementation. The surface plating layer 24 including the Sn plating layer can improve the wettability against the outer electrode 20.

Other Configurations of Outer Electrodes

The outer electrode 20 may be a plating layer that is directly provided on the multilayer body 2 and directly connected with the inner electrode layer 10. Additionally, a catalyst may be provided on the multilayer body 2 as pretreatment of the plating.

It is preferable that the plating layer includes a first plating layer and a second plating layer provided on the first plating layer.

It is preferable that the first plating layer and the second plating layer include, for example, plating of one metal or an alloy including at least one of Cu, Ni, Sn, Pb, Au, Ag, Pd, Bi, and Zn.

For example, when Ni is used as the inner electrode layer 10, it is preferable to use Cu that has good joining properties with Ni as the first plating layer.

Additionally, for example, it is preferable to use Sn or Au with high wettability as the second plating layer. On the other hand, for example, it is preferable to use Ni having the solder barrier performance as the first plating layer.

The second plating layer is formed as needed. For this reason, the outer electrode 20 may be formed of only the first plating layer.

Additionally, the second plating layer may be provided as an outermost layer of the plating layer, or another plating layer may be provided on the second plating layer.

Moreover, for example, it is preferable that a metal ratio per unit volume of the plating layer is about 99 volume % or more.

Furthermore, the plating layer may be obtained by, for example, grain growth along the lamination direction T or may be columnar.

Internal Structure of Multilayer Body (WT Section)

An internal structure of the multilayer body 2, particularly, the internal structure viewed from the second end surface E2 is described based on FIG. 3. FIG. 3 is a sectional view of the multilayer ceramic capacitor that is taken along II-II line illustrated in FIG. 1.

The multilayer body 2 includes an electrode facing portion in which the inner electrode layers 10 face each other and side gap portions SG in the width direction W. The side gap portions SG include a first side gap portion SG1 and a second side gap portion SG2. The first side gap portion SG1 and the second side gap portion SG2 are arranged with the electrode facing portion WF interposed therebetween.

The first side gap portion SG1 is positioned between the electrode facing portion WF and the first side surface S1, and the second side gap portion SG2 is positioned between the electrode facing portion WF and the second side surface S2.

Specifically, the first side gap portion SG1 is positioned between an end of the inner electrode layer 10 on a first side surface S1 side and the first side surface S1, and the second side gap portion SG2 is positioned between an end of the inner electrode layer 10 on a second side surface S2 side and the second side surface S2.

The first side gap portion SG1 and the second side gap portion SG2 do not include the inner electrode layers 10 but include only the dielectric layers 4.

The first side gap portion SG1 and the second side gap portion SG2 define and function as protection layers of the inner electrode layers 10.

Since each of the side gap portions SG is a division in the width direction W, it is also called a W gap.

A length of the side gap portion SG in the width direction W may be, for example, about one tenth of the length of the multilayer body 2 in the width direction W or about 5 μm or more and about 30 μm or less.

Size of Multilayer Ceramic Capacitor

A dimension of the entire multilayer ceramic capacitor 1 including the multilayer body 2 and the outer electrodes 20 in the length direction L may be, for example, about 0.2 mm or more and about 2.0 mm or less. A dimension of the entire multilayer ceramic capacitor 1 in the lamination direction T may be, for example, about 0.1 mm or more and about 1.2 mm or less. A dimension of the entire multilayer ceramic capacitor 1 in the width direction W may be, for example, about 0.1 mm or more and about 1.2 mm or less.

In the present example embodiment, the multilayer ceramic capacitor 1 is a capacitor including two terminals. The multilayer ceramic capacitor 1 is not limited to including two terminals and may be a capacitor including multiple terminals, such as three or more terminals.

Distribution of Rare Earths

Distribution of rare earths in the dielectric layer 4 is described.

The multilayer ceramic capacitor 1 of the present example embodiment includes a distribution of the rare earths in the dielectric layer 4.

For example, in the dielectric layer 4 including $BaTiO_3$, when a load of high temperature and high electric field is applied to a ceramic grain boundary, an oxygen vacancy is moved, and the insulation resistance is deteriorated.

In this case, the movement of the oxygen vacancy is reduced or prevented by dissolution of the rare earths such as, for example, Re into $BaTiO_3$. In addition, as a region in which the rare earths are dissolved in an electric field direction is greater, the movement of the oxygen vacancy is reduced or prevented more, and the reliability becomes higher.

In the multilayer ceramic capacitor 1 of the present example embodiment, the rare earths are uniformly dissolved at a high concentration in an electrolytic direction. Specifically, with the formation of the region in which the rare earths are uniformly dissolved in the electric field direction, that is, in the lamination direction T, the movement of the oxygen vacancy is reduced or prevented, and the reliability is improved.

Hereinafter, descriptions are provided with reference to the drawings.

Figure 4:
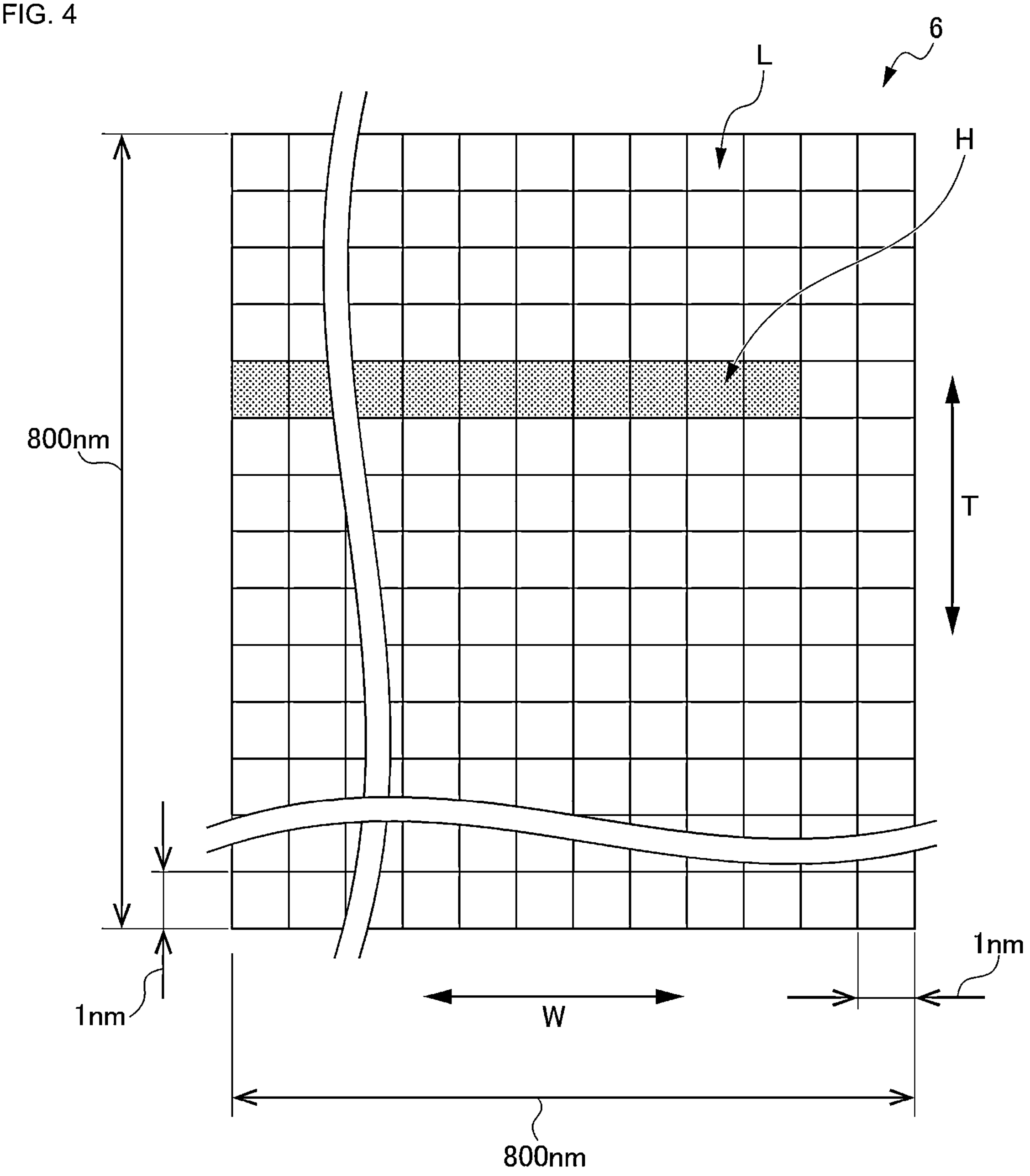
FIG. 4 is a diagram illustrating a method of dividing into cells.

FIG. 4 is a WT sectional view of the inner dielectric layer 6.

A region illustrated in FIG. 4 is a region in a center portion in the width direction W and a center portion in the lamination direction T of the inner dielectric layer 6, which has, for example, a dimension in the width direction W of about 800 nm and a dimension in the lamination direction T of about 800 nm. Hereinafter, a predetermined region in the center portion in the width direction W and the center portion in the lamination direction T of the inner dielectric layer 6 is referred to as an evaluation region in some cases.

A square illustrated in FIG. 4 is a square having a dimension in the width direction W of about 1 nm and a dimension in the lamination direction T of about 1 nm. Each square corresponds to each cell.

Additionally, an array of cells extending in the width direction W is a row, and an array of cells extending in the lamination direction T is a column.

The region illustrated in FIG. 4 is divided into 640000 cells of 800 rows×800 columns in total, for example.

High Concentration Cells and Low Concentration Cells

A cell H in FIG. 4 indicates a high concentration cell, and a cell L in FIG. 4 indicates a low concentration cell.

In this case, for example, the high concentration cell means a cell in which a mole ratio of the rare earths is about 5 mol % or more with respect to 100 mol of Ti. On the other hand, the low concentration cell means a cell in which a mole ratio of the rare earths is less than about 5 mol % with respect to 100 mol of Ti.

Additionally, the rare earths may be at least one of, for example, La, Ce, Pr, Nd, Sm, Eu, Gd, Tb, Dy, Ho, Er, Tm, Yb, Lu, and Y.

In the multilayer ceramic capacitor 1 of the present example embodiment, for example, there are 600 cells or more and less than 800 cells of the high concentration cells in the 800 cells consecutive in the width direction W. That is, for example, about 75% or more and less than about 100% of the cells belonging to each row are the high concentration cells.

Thus, the reliability in the electrolytic direction, or the lamination direction T in other words, is improved.

On the other hand, when the ratio of the high concentration cells H is excessively high, the temperature characteristics are deteriorated. In the multilayer ceramic capacitor 1 of the present example embodiment, the low concentration cells L coexist with the high concentration cells H.

Therefore, it is possible to provide a multilayer ceramic capacitor with a good balance between the improvement of the reliability and the improvement of the temperature characteristics.

The dielectric layer 4 includes multiple dielectric grains. The dielectric grains are, for example, barium titanate ceramic such as a perovskite compound including Ba and Ti and are a ceramic layer including the perovskite compound including Ba and Ti and rare earths. In this case, in the high concentration cells including a predetermined amount or more of the rare earths, the rare earths are likely to be dissolved in barium titanate and the like. In a portion in which the rare earths are dissolved, the movement of the oxygen vacancy is likely to be reduced or prevented.

In this case, when a predetermined ratio or more of the high concentration cells exist in the width direction W, or a row direction in other words, orthogonal or substantially orthogonal to the electrolytic direction, the movement of the oxygen vacancy is reduced or prevented efficiently. As a result, it is possible to improve the reliability of the multilayer ceramic capacitor 1.

Figure 5:
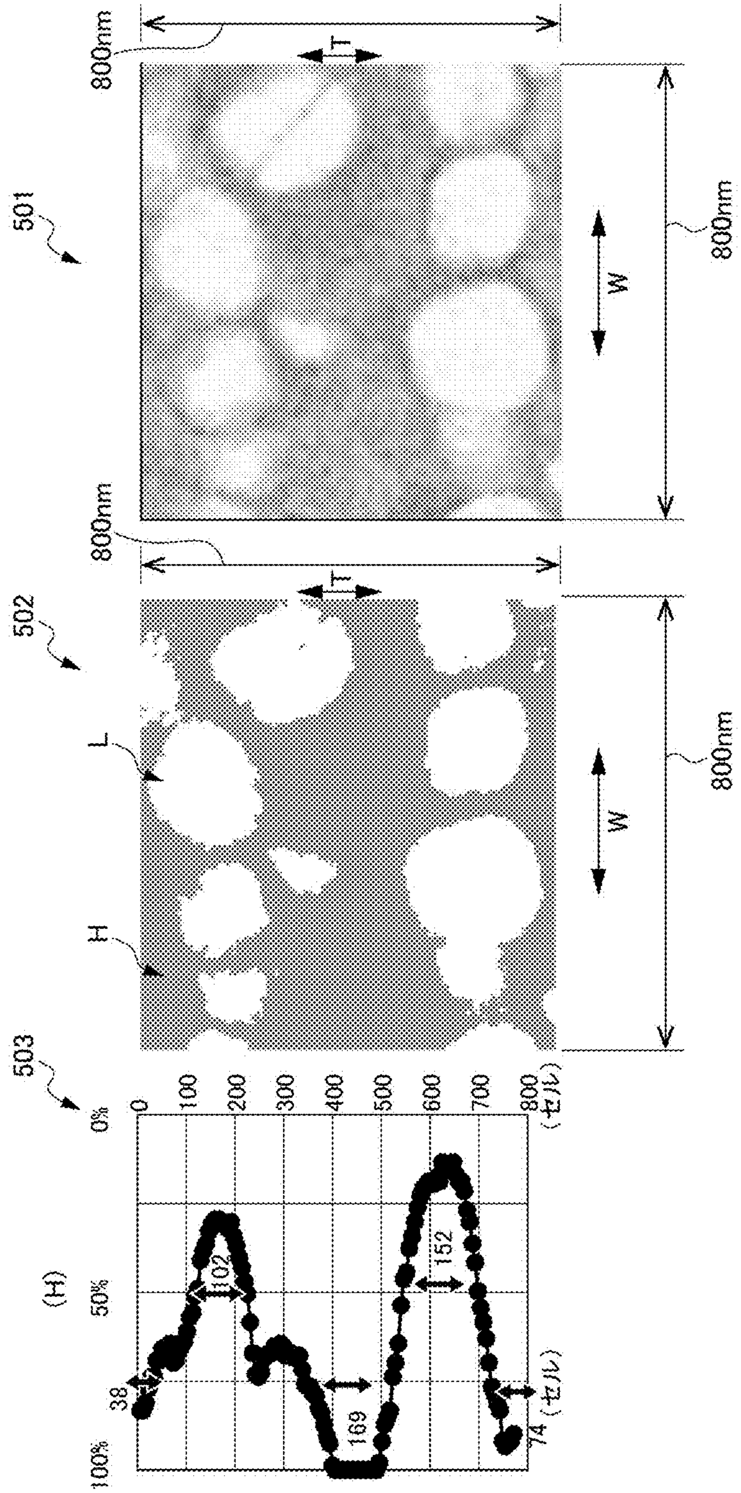
FIG. 5 is a diagram illustrating distribution of high concentration cells.
Figure 6:
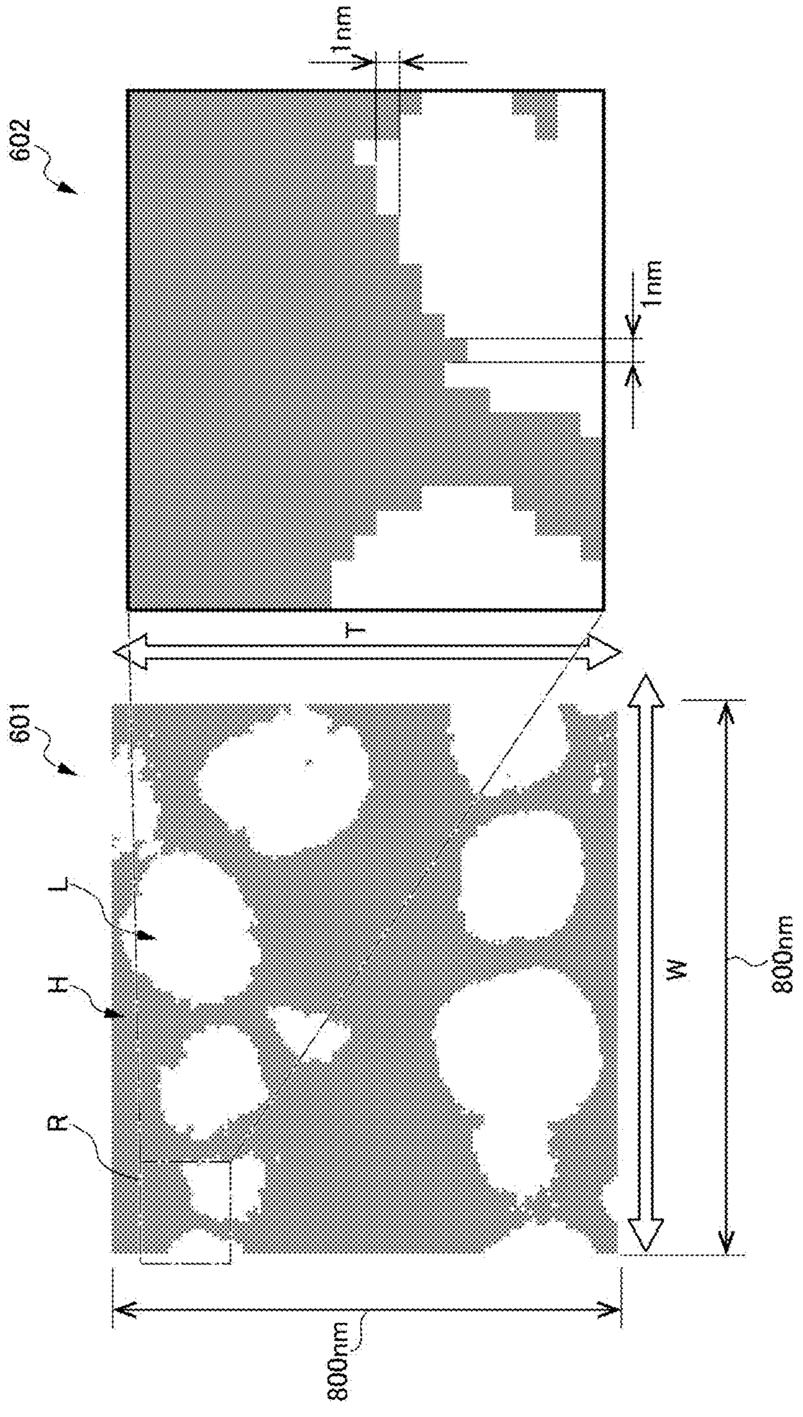
FIG. 6 is a diagram illustrating a method of counting the number of the high concentration cells.

Specific descriptions are provided based on FIGS. 5 and 6.

FIG. 5 is a diagram illustrating distribution of high concentration regions H in about 800 nm×about 800 nm in the above-described evaluation region.

501 in FIG. 5 indicates distribution of a mole ratio of the rare earths in the cells obtained by TEM (Transmission Electron Microscope)-EDX (Energy Dispersive X-ray Spectroscopy).

502 in FIG. 5 is a diagram illustrating distribution of a binarized mole ratio of the rare earths in each cell. In the binarization, for example, a cell in which the mole ratio of the rare earths is about 5 mol % or more with respect to 100 mol of Ti is set to the high concentration cell H, and a cell in which the mole ratio of the rare earths is less than about 5 mol % with respect to 100 mol of Ti is set to the low concentration cell L.

503 in FIG. 5 is a diagram illustrating a ratio of the high concentration cells H in each row.

As illustrated in FIG. 5, with the binarization of the analysis result obtained by TEM-EDX, it is possible to obtain the ratio of the high concentration cells H in each row.

An example of a method of obtaining the ratio of the high concentration cells H in each row is specifically described based on FIG. 6.

As with 502 in FIG. 5, 601 in FIG. 6 is a diagram illustrating distribution of the binarized mole ratio of the rare earths in each cell.

602 in FIG. 6 is a diagram that enlarges a rectangular box R in 601 in FIG. 6.

As described above, for example, the evaluation region is divided into a cell of about 1 nm×about 1 nm. In addition, the analysis by the TEM-EDX and the binarization of the analysis result are performed for each cell. Therefore, as indicated by 602 in FIG. 6, the binarized result is outputted in the form of mosaic in a unit of about 1 nm.

Then, with summing of the number of the high concentration cells H in each row, it is possible to obtain the ratio of the high concentration cells H in each row as indicated by 503 in FIG. 5.

Additionally, similarly, it is possible to obtain how the ratio of the high concentration cells H is distributed in the lamination direction T.

In the example illustrated in FIG. 5, there is a row in which the ratio of the high concentration cells H in the row direction is about 75% or more and less than about 100%.

Figure 7:
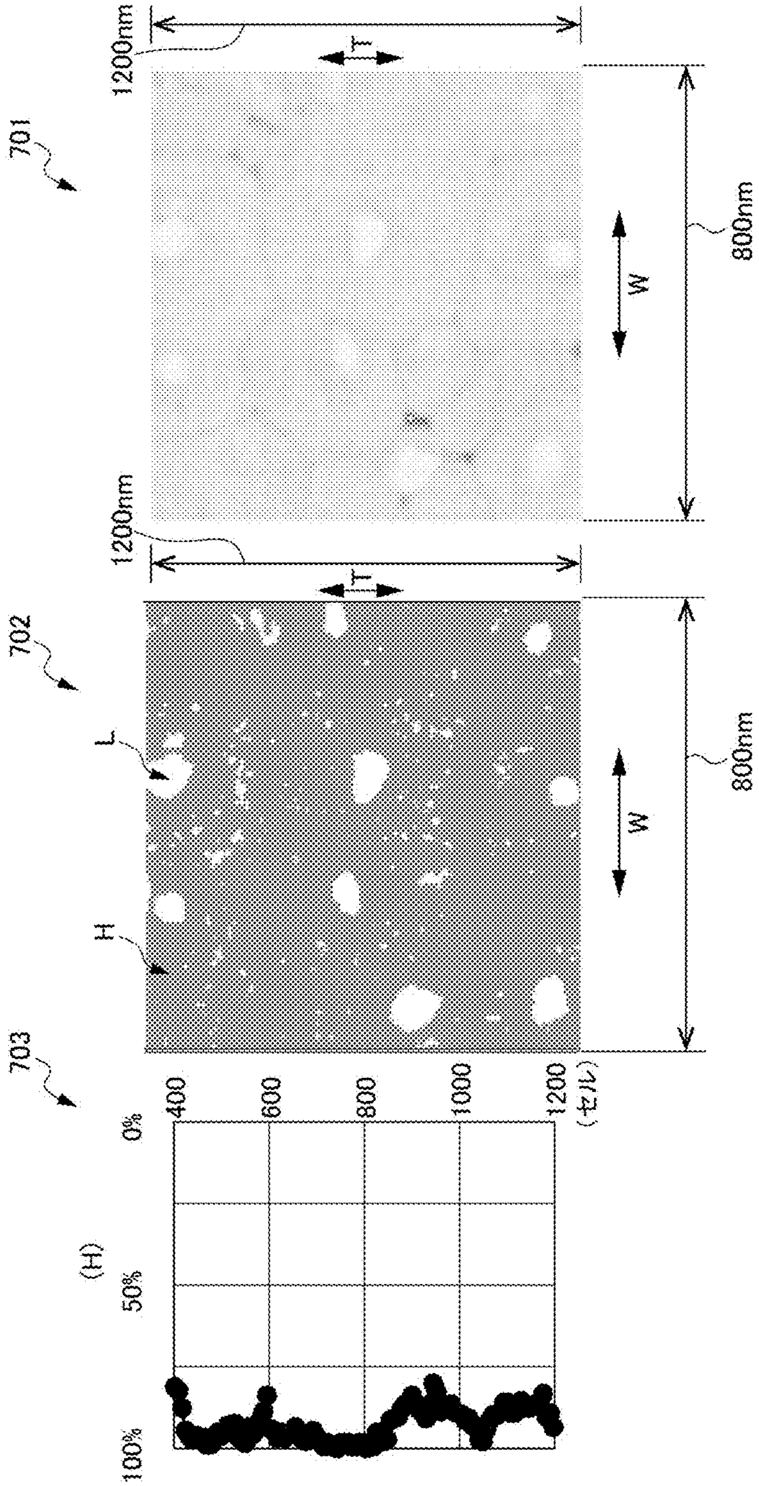
FIG. 7 is a diagram illustrating another distribution of high concentration cells.
Figure 8:
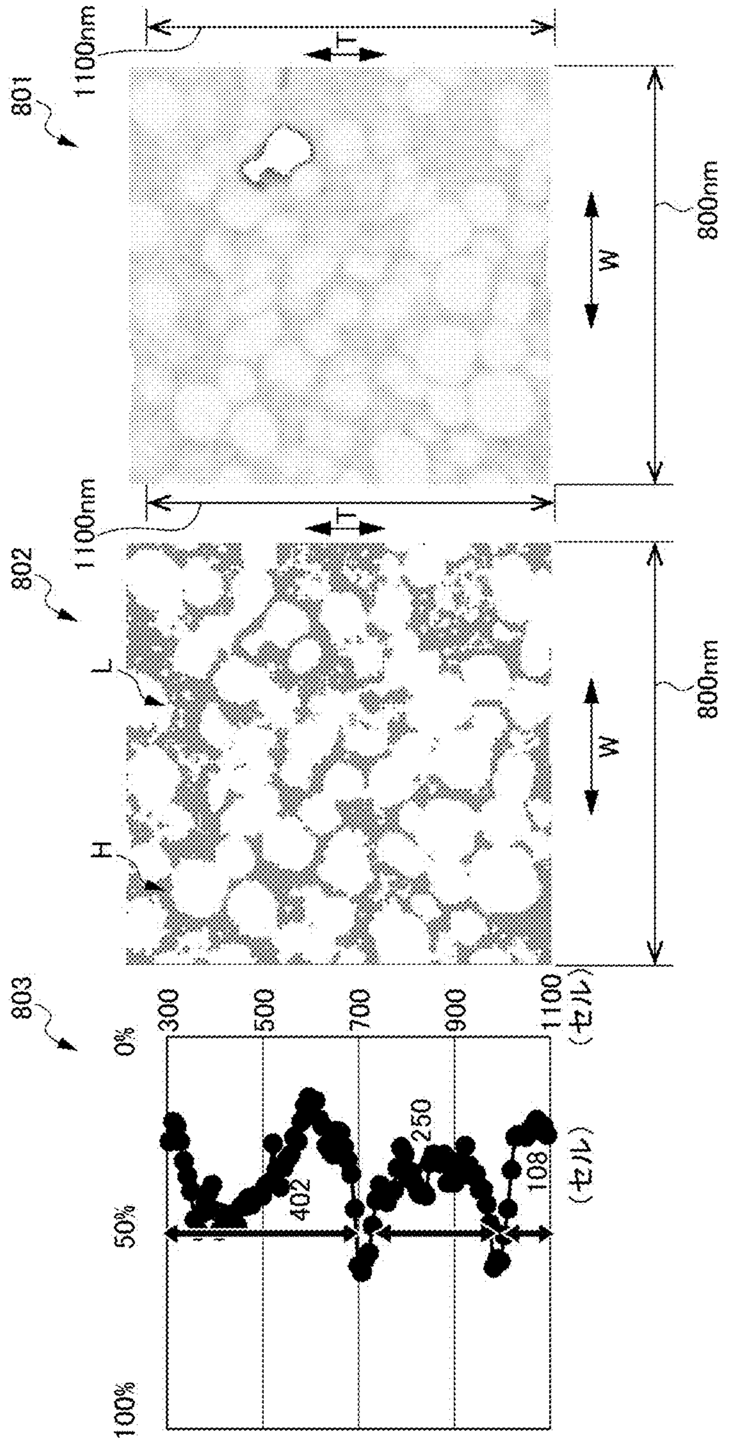
FIG. 8 is a diagram illustrating another distribution of high concentration cells.

FIGS. 7 and 8 are diagrams corresponding to FIG. 5 in other multilayer ceramic capacitors.

FIG. 7 illustrates an example in which the ratio of high concentration cells H is higher than that of the multilayer ceramic capacitor 1 illustrated in FIG. 5. Additionally, FIG. 8 illustrates an example in which the ratio of high concentration cells H is lower than that of the multilayer ceramic capacitor 1 illustrated in FIG. 5.

In the multilayer ceramic capacitor illustrated in FIG. 7, as indicated by 702 in FIG. 7, the ratio of the high concentration cells H is higher than that in 502 in FIG. 5. Therefore, for example, as indicated by 703 in FIG. 7, the ratio of the high concentration cells H is about 75% or more in all the rows in the lamination direction T.

On the other hand, in the multilayer ceramic capacitor illustrated in FIG. 8, as indicated by 802 in FIG. 8, the ratio of the high concentration cells H is lower than that in 502 in FIG. 5. Therefore, for example, as indicated by 803 in FIG. 8, there is no row in which the ratio of the high concentration cells H is about 75% or more.

Distribution in Lamination Direction

Next, distribution of the high concentration cells H in a column direction, that is, the lamination direction T is described.

In this case, for example, a high concentration row is a row in which about 75% or more of the 800 cells in the same row are the high concentration cells.

For example, it is preferable that about 9% or more and about 43% or less of the total number of the rows included in the evaluation region are the high concentration rows. When the total number of the rows is 800 rows, for example, it is preferable that the high concentration rows are 72 rows or more and 344 rows or less.

With a predetermined ratio or more of the high concentration cells H existing, it is possible to improve the reliability of the multilayer ceramic capacitor 1.

However, when the ratio of the high concentration cells H is excessively high, the temperature characteristics are deteriorated.

Therefore, for example, with the ratio of the high concentration rows being set to be about 9% or more and about 43% or less of the 800 rows, which is the total number of the rows included in the evaluation region, it is possible to reduce or prevent the deterioration of the temperature characteristics while improving the reliability.

In the multilayer ceramic capacitor in FIG. 5 described above, as indicated by 503 in FIG. 5, 281 rows out of the 800 rows are the high concentration rows. The ratio of the high concentration rows is, for example, about 35%.

Therefore, in the multilayer ceramic capacitor illustrated in FIG. 5, it is possible to reduce or prevent the deterioration of the temperature characteristics while improving the reliability.

On the other hand, in the multilayer ceramic capacitor illustrated in FIG. 7, as indicated by 703 in FIG. 7, all of the 800 rows are the high concentration rows. Therefore, the multilayer ceramic capacitor illustrated in FIG. 7 is inferior to the multilayer ceramic capacitor in FIG. 5 in the temperature characteristics.

Low Concentration Cells

Next, a ratio of the low concentration cells L is described.

As described above, for example, the low concentration cell L is a cell in which the mole ratio of the rare earths is less than about 5 mol % with respect to 100 mol of Ti. It is preferable that the number of the low concentration cells L is, for example, about 71% or less of the total number of the cells in the evaluation region.

When the ratio of the low concentration cells L is greater than the predetermined range, it is impossible to ensure the reliability. When the number of the low concentration cells L in the region is increased, there is the possibility that a way of escape of an electron is provided in the electric field direction. Therefore, it is impossible to ensure the reliability.

Next, characteristics of an example and a comparative example of the present invention are described based on FIG. 9. FIG. 9 is a table illustrating characteristics and the like of the example and the comparative example of the present invention.

A ratio of a high concentration region in one line described in FIG. 9 means a ratio of the high concentration cells in the cells belonging to each row. For example, when 200 cells of the 800 cells belonging to each row are the high concentration cells, the ratio of the high concentration region in one line is 25%.

MTTF means Mean Time to Failure.

A high concentration region rate means a ratio of the high concentration rows in the 800 rows when the high concentration row is a row in which, for example, about 75% or more of the 800 cells belonging to the same row are the high concentration cells. For example, when there are 200 rows of the high concentration rows out of the 800 rows, the high concentration region rate is 25%.

A low concentration region rate means a ratio of the low concentration cells in all of the cells in the evaluation region. For example, when there are 320000 cells of the low concentration cells of the 640000 cells in 800 rows×800 columns, the low concentration region rate is 50%.

MTTF

As illustrated in FIG. 9, better MTTF was obtained in an example 1 to an example 6 in which the ratio of the high concentration region in one line is about 75% or more and less than about 100% than that in a comparative example 2 and a comparative example 3 in which the ratio of the high concentration region in one line is less than about 75%. In a comparative example 1 in which the ratio of the high concentration region in one line is about 100%, although MTTF was good, the temperature characteristics of the relative permittivity were poor.

Similarly, in the example 1 to the example 6 in which the high concentration region rate is about 9% or more and about 43% or less, MTTF was good as described above.

Additionally, in the example 1 to the example 6 in which the low concentration region rate is about 71% or less, the temperature characteristics were good. In the comparative example 1 in which the low concentration region rate is 0%, other characteristics deviated from a preferable range.

Measurement Method

It is possible to achieve manufacturing of a sample used in the TEM-EDX described above by exposing a surface of the multilayer body 2, which extends in the width direction W and the lamination direction T, by polishing a section in a center portion in a longitudinal direction L of the multilayer body 2. Then, an image of a center portion of the section is captured in about 800 nm×about 800 nm.

Permittivity Measurement Method

Next, a permittivity measurement method is described.

The permittivity is calculated by the expression below after applying a voltage of about 1 KHz and about 0.8 KV/mm and measuring the electrostatic capacitance.

$$\text{Cap} = \varepsilon r \cdot \varepsilon 0 \times S/d$$

Cap is the permittivity, εr is a relative permittivity of a specimen, ε0 is a vacuum permittivity, S is an area of an electrode, and d is a dielectric layer thickness.

Method of Manufacturing Multilayer Ceramic Capacitor

As a general process of manufacturing steps, it is possible to manufacture the multilayer ceramic capacitor 1 of the present example embodiment by a similar method as that of a multilayer ceramic capacitor 1 of the related art.

In addition, in order to provide desired distribution of the rare earths in the dielectric layer 4, for example, the following method may be used.

That is, in manufacturing a multilayer block, in a dielectric sheet to be laminated, the distribution of the rare earths in a surface of the dielectric sheet is adjusted. Additionally, in laminating the dielectric sheet, the distribution of the rare earths in the dielectric sheet to be laminated is adjusted such that the distribution of the rare earths in the lamination direction is desired distribution.

Thus, it is possible to distribute the rare earths in a desired aspect in the width direction W, the length direction L, and the lamination direction T.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor, comprising:

a multilayer body including dielectric layers and inner electrode layers alternately laminated with each other; and an outer electrode on a surface of the multilayer body and electrically connected with the inner electrode layers extending to the surface of the multilayer body; wherein the dielectric layers include at least Ti;

a region in a center portion in a lamination direction of the dielectric layers and a width direction orthogonal or substantially orthogonal to the lamination direction with a dimension in the width direction of about 800 nm and a dimension in the lamination direction of about 1 nm is divided into 800 cells with a size of a dimension in the width direction of about 1 nm and a dimension in the lamination direction of about 1 nm; and when a cell in which a mole ratio of rare earths is about 5 mol % or more with respect to 100 mol of Ti is a high concentration cell, about 75% or more and less than about 100% of the 800 cells in the region are high concentration cells.

2. The multilayer ceramic capacitor according to claim 1, wherein a thickness of each of the dielectric layers is about 0.8 μm or more and about 3.0 μm or less.

3. The multilayer ceramic capacitor according to claim 1, wherein a dimension of the multilayer body in a length direction is about 0.05 mm or more and about 1.00 mm or less;

a dimension of the multilayer body in the lamination direction is about 0.10 mm or more and about 0.50 mm or less; and a dimension of the multilayer body in the width direction is about 0.10 mm or more and about 0.50 mm or less.

4. The multilayer ceramic capacitor according to claim 1, wherein a number of the dielectric layers is 10 or more and 2000 or less.

5. The multilayer ceramic capacitor according to claim 1, wherein each of the dielectric layers includes $BaTiO_3$, $CaTiO_3$, $SrTiO_3$, $CaZrO_3$, or $TiO_2$ as a main component.

6. The multilayer ceramic capacitor according to claim 5, wherein each of the dielectric layers includes a Mn compound, an Fe compound, a Cr compound, a Co compound, or a Ni compound as a subcomponent.

7. The multilayer ceramic capacitor according to claim 1, wherein a number of the inner electrode layers is 10 or more and 1000 or less.

8. The multilayer ceramic capacitor according to claim 1, wherein a thickness of each of the inner electrode layers is about 0.3 μm or more and about 0.4 μm or less.

9. The multilayer ceramic capacitor according to claim 1, wherein each of the inner electrode layers includes Ni, Cu, Ag, Pd, or Au, an alloy of Ni and Cu, or an alloy of Ag and Pd.

10. A multilayer ceramic capacitor, comprising:

a multilayer body including dielectric layers and inner electrode layers alternately laminated with each other; and an outer electrode on a surface of the multilayer body and electrically connected with the inner electrode layers extending to the surface of the multilayer body; wherein the dielectric layers include at least Ti;

a region in a center portion in a lamination direction of the dielectric layers and a width direction orthogonal or substantially orthogonal to the lamination direction with a dimension in the width direction of about 800 nm and a dimension in the lamination direction of about 800 nm is divided into 800 cells in the width direction and 800 cells in the lamination direction with a size of a dimension in the width direction of about 1 nm and a dimension in the lamination direction of about 1 nm;

an array of cells in the width direction is a row, and an array of cells in the lamination direction is a column; and when a cell in which a mole ratio of rare earths is about 5 mol % or more with respect to 100 mol of Ti is a high concentration cell, and when a row in which about 75% or more of 800 cells in a same row are high concentration cells is a high concentration row, about 9% or more and about 43% or less of 800 rows in the region are high concentration rows.

11. The multilayer ceramic capacitor according to claim 10, wherein, when a cell in which a mole ratio of rare earths is less than about 5 mol % with respect to 100 mol of Ti is a low concentration cell, a number of low concentration cells is about 71% or less of a total number of the cells in the region.

12. The multilayer ceramic capacitor according to claim 10, wherein a thickness of each of the dielectric layers is about 0.8 μm or more and about 3.0 μm or less.

13. The multilayer ceramic capacitor according to claim 10, wherein a dimension of the multilayer body in a length direction is about 0.05 mm or more and about 1.00 mm or less;

a dimension of the multilayer body in the lamination direction is about 0.10 mm or more and about 0.50 mm or less; and a dimension of the multilayer body in the width direction is about 0.10 mm or more and about 0.50 mm or less.

14. The multilayer ceramic capacitor according to claim 10, wherein a number of the dielectric layers is 10 or more and 2000 or less.

15. The multilayer ceramic capacitor according to claim 10, wherein each of the dielectric layers includes $BaTiO_3$, $CaTiO_3$, $SrTiO_3$, $CaZrO_3$, or $TiO_2$ as a main component.

16. The multilayer ceramic capacitor according to claim 15, wherein each of the dielectric layers includes a Mn compound, an Fe compound, a Cr compound, a Co compound, or a Ni compound as a subcomponent.

17. The multilayer ceramic capacitor according to claim 10, wherein a number of the inner electrode layers is 10 or more and 1000 or less.

18. The multilayer ceramic capacitor according to claim 10, wherein a thickness of each of the inner electrode layers is about 0.3 μm or more and about 0.4 μm or less.

19. The multilayer ceramic capacitor according to claim 10, wherein each of the inner electrode layers includes Ni, Cu, Ag, Pd, or Au, an alloy of Ni and Cu, or an alloy of Ag and Pd.

* * * * *